United States Patent
Wagh et al.

(10) Patent No.: US 7,849,252 B2
(45) Date of Patent: Dec. 7, 2010

(54) PROVIDING A PREFIX FOR A PACKET HEADER

(75) Inventors: Mahesh Wagh, Portland, OR (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 12/156,409

(22) Filed: May 30, 2008

(65) Prior Publication Data

US 2009/0296740 A1    Dec. 3, 2009

(51) Int. Cl.
*G06F 13/00* (2006.01)
(52) U.S. Cl. ............... 710/313; 370/389; 370/393; 370/474
(58) Field of Classification Search ............. 710/107, 710/305, 313, 316; 370/356, 389, 392, 393, 370/469, 471, 474, 475
See application file for complete search history.

(56) References Cited

U.S. PATENT DOCUMENTS 7,464,174 B1 * 12/2008 Ngai .................. 709/234
2005/0144339 A1   6/2005 Wagh et al. ............... 710/36
2006/0268913 A1 * 11/2006 Singh et al. ............... 370/412
2007/0067432 A1 *  3/2007 Tarui et al. ............... 709/223

OTHER PUBLICATIONS

U.S. Appl. No. 11/592,341, filed Nov. 2, 2006, entitled "PCI Express Enhancements and Extensions," by Jasmin Ajanovic, et al.
Intel Corporation, "Initiatives and Technologies—PCI Express Provides Enterprise Reliability, Availability, and Serviceability," 2003, pp. 1-8.
Ravi Budruk, et al, informIT, "Address Spaces & Transaction Routing," Feb. 20, 2004, pp. 1-19.

* cited by examiner

*Primary Examiner*—Glenn A Auve
(74) *Attorney, Agent, or Firm*—Trop, Pruner & Hu, P.C.

(57) ABSTRACT

In one embodiment, the present invention includes a method for generating a prefix header with an opcode field and a prefix specific field for a first packet to be transmitted from a transmitter, and transmitting the packet from the transmitter with the prefix header, which is followed by a header. Other embodiments are described and claimed.

19 Claims, 6 Drawing Sheets

PROVIDING A PREFIX FOR A PACKET HEADER

BACKGROUND

Computer systems include a number of components and elements, which are typically coupled via a bus or interconnect. Previously, input/output (IO) devices were coupled together through a conventional multi-drop parallel bus architecture referred to as Peripheral Component Interconnect (PCI). More recently, a new generation of an IO bus referred to as PCI-Express (PCIe) has been used to facilitate faster interconnection between devices having a serial physical layer communication protocol.

A PCIe architecture includes a layered protocol to communicate between devices. As an example, a physical layer, link layer, and transaction layer form a PCIe protocol stack. The PCIe link is built around dedicated unidirectional pairs of serial point-to-point connections referred to as a lane. A link between devices includes some number of lanes, such as one, two, sixteen, thirty-two, and so-on. The current PCIe specification, PCI Express™ Specification Base Specification version 2.0 (published Jan. 17, 2007), is available at http://www.pcisig.com/specifications/pciexpress/.

A physical layer can transmit (or receive) three types of link traffic: ordered sets, data link layer packets (DLLPs), and transaction layer packets (TLPs). Local link traffic, which includes ordered sets and DLLPs, is not forwarded and carries no routing information. In contrast, TLPs can pass from link to link, using routing information contained in a packet header. Specifically, each TLP contains a three or four double word (DW) (12 or 16 byte) header. Included in the 3DW or 3DW header are, inter alia, two fields: type and format (Fmt) that define the format of the remainder of the header and the routing method to be used on the entire TLP as it moves between devices in a PCIe system. While the header provides needed information, its format is fixed and prevents flexibility to provide additional information by way of the header.

DETAILED DESCRIPTION

Embodiments may extend the PCIe architecture header format to support emerging application requirements. More specifically, in various embodiments a TLP prefix, which is an architected definition of additional header information that can be appended to a TLP header, can be used to enable flexibility of information provided in a TLP or other such packet header. That is, while described for example herein as applying to TLPs of a PCIe system, the scope of the present invention is not limited in this regard, and embodiments can be used to enable transmission of additional header information for packets of various communication protocols.

In different implementations, this TLP prefix header can be used as an encapsulation layer to PCIe transaction layer headers, provide additional routing information to assist intermediate routing elements in routing TLPs, provide transaction processing hints to a completer, and/or provide vendor specific debug information. Still further a prefix in accordance with an embodiment of the present invention can be used to provide security information and provisioning for future use models that may need extended headers to provide additional information that is not present in a currently specified header format field.

Figure 1:
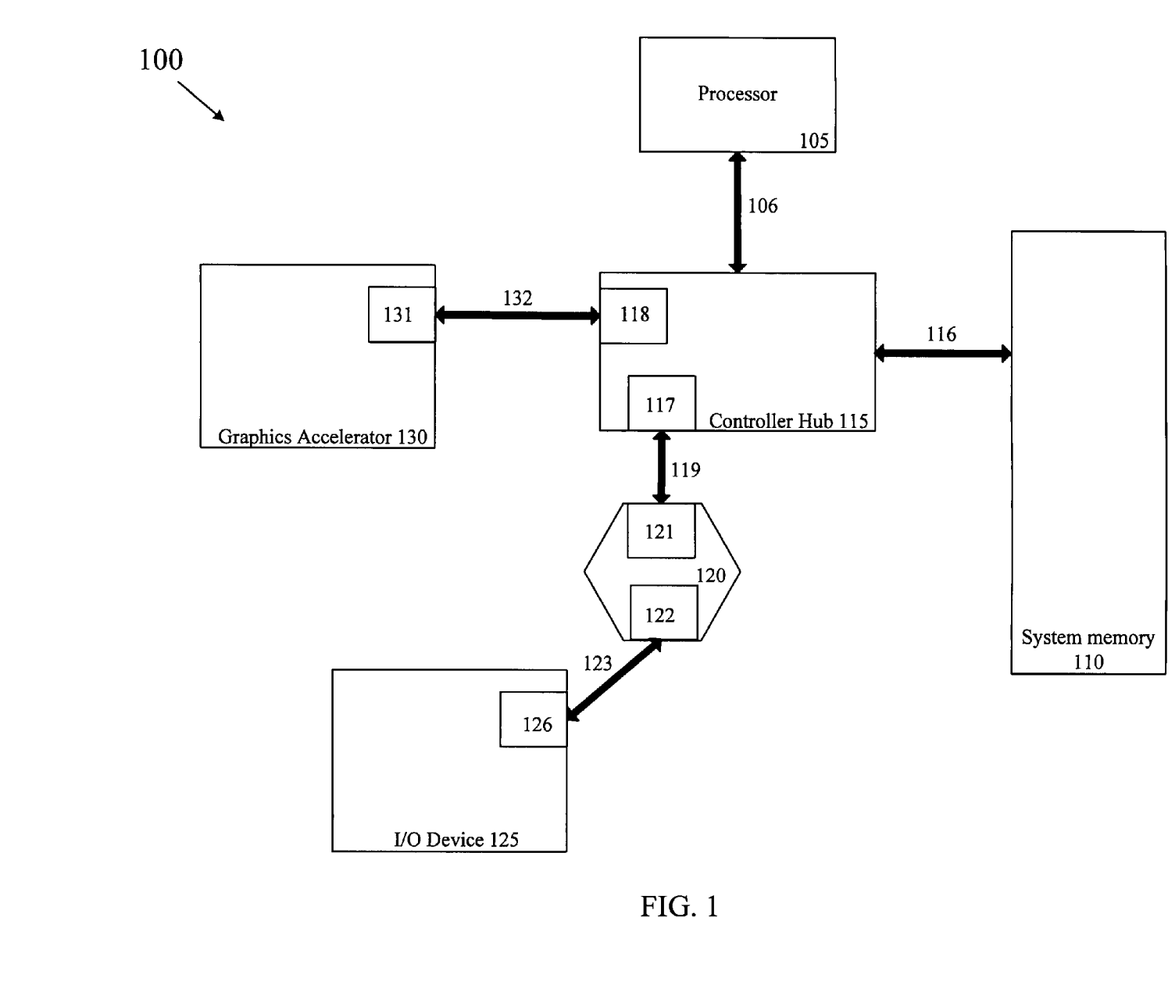
FIG. 1 is a block diagram of a system in accordance with one embodiment of the present invention.

Referring to FIG. 1, a block diagram of a system in accordance with one embodiment of the present invention including devices coupled to a controller hub via a serial link is illustrated. System 100 includes a processor 105 and a system memory 110 coupled to a controller hub 115. Processor 105 includes any processing element, such as a microprocessor, a host processor, an embedded processor, a co-processor, or other processor. Processor 105 is coupled to controller hub 115 through a front-side bus (FSB) 106. In one embodiment, FSB 106 is a serial point-to-point (PtP) interconnect as described below.

System memory 110 includes any memory device, such as random access memory (RAM), non-volatile (NV) memory, or other memory accessible by devices in system 100. System memory 110 is coupled to controller hub 115 through a memory interface 116.

In one embodiment, controller hub 115 is a root hub or root controller in a PCIe interconnection hierarchy. Examples of controller hub 115 include a chipset, a memory controller hub (MCH), a northbridge, an input/output controller hub (ICH) a southbridge, and a root controller/hub. Here, controller hub 115 is coupled to a switch/bridge 120 through a serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120. Embodiments may also apply where a processor and chipset are integrated into the same package. Further, this technique does not require a new revision of PCIe protocol, and can be implemented by PCIe 2.0, 1.1 compatible devices, among others. Thus embodiments can be used anywhere a PCIe interconnect is used for communication.

Switch 120 routes packets/messages from a device 125 upstream, i.e., up a hierarchy towards controller hub 115 and downstream, i.e., down a hierarchy away from controller hub 115 to device 125. IO modules 122 and 126 implement a layered protocol stack to communicate between switch 120 and device 125. Device 125 includes any internal or external device or component to be coupled to an electronic system, such as an IO device, a network interface controller (NIC), an add-in card, an audio processor, a network processor, a hard-drive, a storage device, a monitor, a printer, a mouse, a keyboard, a router, a portable storage device, a Firewire device, a Universal Serial Bus (USB) device, a scanner, and other input/output devices.

A graphics accelerator 130 is also coupled to controller hub 115 through serial link 132. In one embodiment, graphics accelerator 130 is coupled to an MCH, which is coupled to an ICH. Switch 120, and accordingly IO device 125, is then coupled to the ICH. IO modules 131 and 118 are also to implement a layered protocol stack to communicate between graphics accelerator 130 and controller hub 115.

In one embodiment, a PCIe protocol stack may include a transaction layer, a link layer, and a physical layer. In one embodiment, the transaction layer is to provide an interface between a device's processing core and the interconnect architecture, such as a data link layer and a physical layer. In this regard, a primary responsibility of the transaction layer is the assembly and disassembly of packets (i.e., transaction layer packets, or TLPs). Note that to enable the smooth implementation of reliability-availability-serviceability (RAS), PCIe provides reliable protocol error detection, correction, and reporting capabilities at three cooperative functional layers of a device architecture: physical, link, and transaction layers. Within a PCIe-based design, one or more TLPs combine to form a transaction, which is transmitted over a link from one device on the bus to another. For a given TLP, a device provides device-level error detection and correction through analysis of reliability mechanisms present in every TLP. These error detection/correction responsibilities span the three functional device layers. PCIe also implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in the transaction layer. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

The link layer acts as an intermediate stage between the transaction layer and the physical layer. In one embodiment, a responsibility of the data link layer is to provide a reliable mechanism for exchanging TLPs between two components by a link. One side of the link layer accepts TLPs assembled by the transaction layer, applies identifiers, calculates and applies an error detection code, i.e., cyclic recovery codes (CRC), and submits the modified TLPs to the physical layer for transmission across a physical link to an external device.

In one embodiment, the physical layer physically transmits a packet to an external device. The physical layer includes a transmit section to prepare outgoing information for transmission and a receiver section to identify and prepare received information before passing it to the link layer. The physical layer includes a transmitter and a receiver. The transmitter is supplied with symbols, which the transmitter serializes and transmits onto to an external device. The receiver is supplied with serialized symbols from an external device and transforms the received signals into a bit-stream. The bit-stream is de-serialized and supplied to a logical sub-block. In one embodiment, an 8b/10b transmission code is employed, where ten-bit symbols are transmitted/received. In addition, in one example, the receiver also provides a symbol clock recovered from the incoming serial stream. As stated above, although the transaction layer, link layer, and physical layer are discussed in reference to a specific embodiment of a PCIe protocol stack, a layered protocol stack is not so limited. In fact, any layered protocol may be included/implemented.

Thus inter-device communication occurs in a PCIe system via the transmission of one or more TLPs that combine to form a transaction transmitted across a link coupled between two devices. Using the three layers described above, a TLP thus may be transmitted that includes various information. Specifically, the physical layer may provide frame information at a beginning and end of a TLP. In turn, the link layer may provide a sequence number to the packet as well as a link CRC. In turn, the transaction layer may generate a header that is appended to data (if present) and an optional end-to-end CRC (ECRC). In this way, a transmitted TLP may include the following portions in sequence: a simple transmission protocol (STP) framing field, a sequence field, a header field, a data field, an ECRC field, and link CRC (LCRC) field, and a framing end field. As described above, this format of the TLP header is fixed and does not provide for flexibility in providing additional information associated with such a header.

Figure 2:
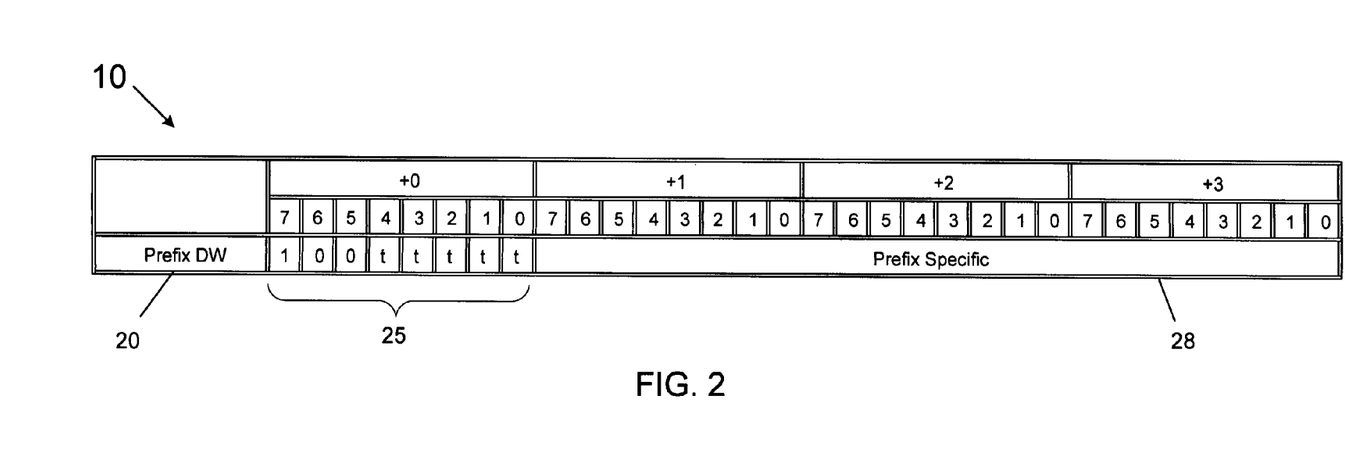
FIG. 2 is a base TLP prefix header in accordance with one embodiment of the present invention.

To add flexibility, TLP prefixes in accordance with an embodiment of the present invention can be appended to TLP's defined by the PCIe specification. In one such embodiment, the base TLP prefix size can be one double word (DW) and can be appended to TLP headers, both currently defined and future TLP headers. As shown in FIG. 2, which is a base TLP prefix header in accordance with one embodiment of the present invention, the prefix can include an opcode field and prefix specific field. Specifically, as shown in FIG. 2, data 10 includes a base TLB prefix header formed of a prefix DW 20 having a first field 25, which may correspond to an opcode field and a prefix specific field 28, which may provide various information based on the opcode field with which it is associated. As shown in the embodiment of FIG. 2, opcode field 25 may have fixed, i.e., predetermined, most significant bits (MSBs). Namely, the three MSBs may have a value of "100" to indicate presence of a prefix. In turn, the least significant bits (LSBs), shown in the embodiment of FIG. 2 as the 5 LSBs, may have a varying value to correspond to a given opcode assignment.

In one embodiment, the opcode field may be associated with the following assignments.

TABLE 1

| | |
|---|---|
| 100 | ttttt, where ttttt is the TLP prefix opcode (i.e., up to 32 prefixes can be defined); |
| 100-00000 | vendor-specific; |
| 100-00001 | extended opcode prefix; |
| 100-11111 | TLP prefix expansion; and |
| 100-others | reserved for future use. |

Figure 3:
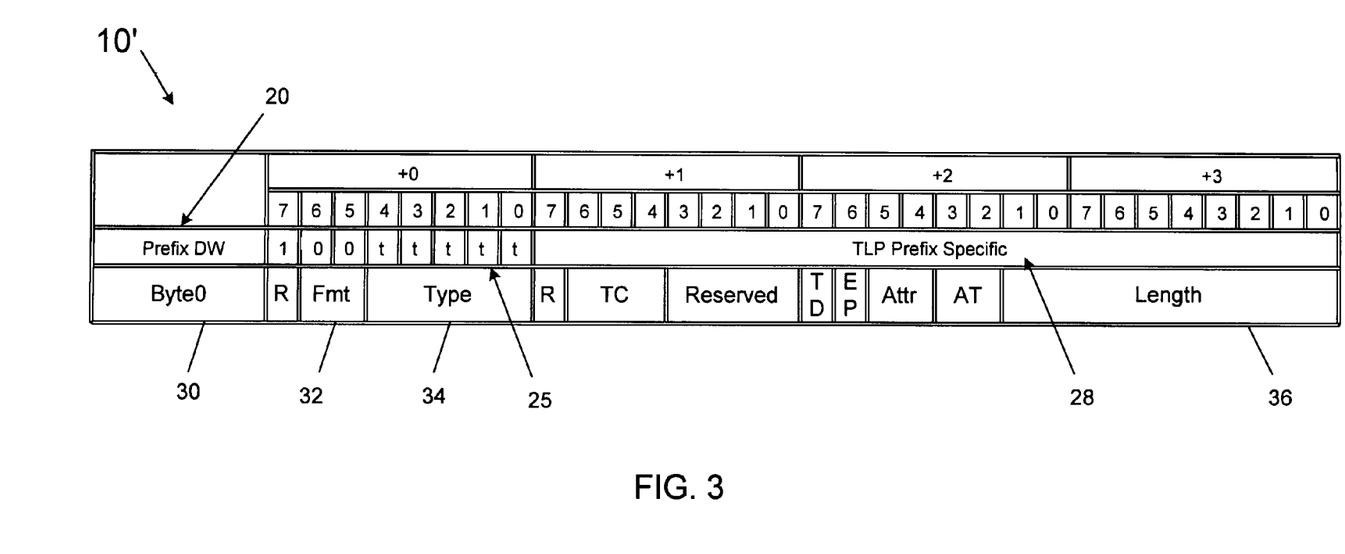
FIG. 3 is a block diagram of a TLP prefix appended to a TLP in accordance with an embodiment of the present invention.

Referring now to FIG. 3, shown is a block diagram of a TLP prefix appended to a TLP in accordance with an embodiment of the present invention. As shown in FIG. 3, data 10' includes a TLP prefix 20, which may correspond to that described above regarding FIG. 2 and a TLP header 30. As shown in FIG. 3, only a first DW of the TLP header is shown. However, it is to be understood that in various implementations, a TLP header may be formed of three or four DWs. TLP header 30 may include various fields. Specific fields shown in FIG. 3 include a format field 32, a type field 34, and a length field 36. Format field 32 and type field 34 may be used to define the format of the remainder of header 30 and the routing method to be used on the entire TLP as it traverses different devices. Furthermore, a length field 36 may indicate a length of a data portion of the TLP to follow header 30. Note that the structure of header 30 is fixed by the PCIe protocol and thus lacks the ability for flexibility. Thus embodiments of the present invention may provide the flexibility to provide additional information associated with a TLP header by including one or more TLP prefixes in front of the TLP header.

To effect functionality, TLP prefix support can be enabled end-end (through the hierarchy). However in the scope in some cases may be limited to link-link for link local TLP prefixes, while others may be routed to endpoint and intermediate switches. For routing elements (e.g., switches, peer-peer, and so forth), TLP prefixes can be ignorable by default unless a given usage model requires them to be understood and processed. For example, a per hop append/remove TLP that is terminated at the remote end of the link and regenerated (Link-Local TLPs) may be used.

In various systems, there can be two TLP prefix types. First, a link local TLP prefix may be provided, for which routing elements need to process the TLP for routing or other purposes. Such a prefix can be used when both ends understand the TLP prefix. That is, this type of prefix is not a blind pass through for routing elements. Note that an ECRC is not applicable to link local TLP prefix headers.

A second prefix may be a global TLP prefix, which can be used where the TLP is to pass through routing elements, as such routing elements may not be aware of TLP prefix contents. If a base TLP is protected by ECRC, then a corresponding global TLP prefix is also protected by ECRC.

The base TLP prefix shown in FIG. 2 provides 24 bits for TLP opcode specific fields. In certain usage cases, this number of bits may not be sufficient and one or more additional DWs may be used to provide TLP prefix expansion, for example, where additional opcode specific bits are required. In such cases, the TLP prefix opcode encoding of 100-11111 can be used to provide expansion of the TLP opcode specific field. The advantages of TLP expansion opcode are as follows: provide a fixed DW size TLP prefix architecture that can be expanded when required; enable definition of TLP prefixes that require greater than 24 bits of fields; and provide the ability to grow the TLP prefix opcode specific fields in the future without impacting ecosystem.

Figure 4:
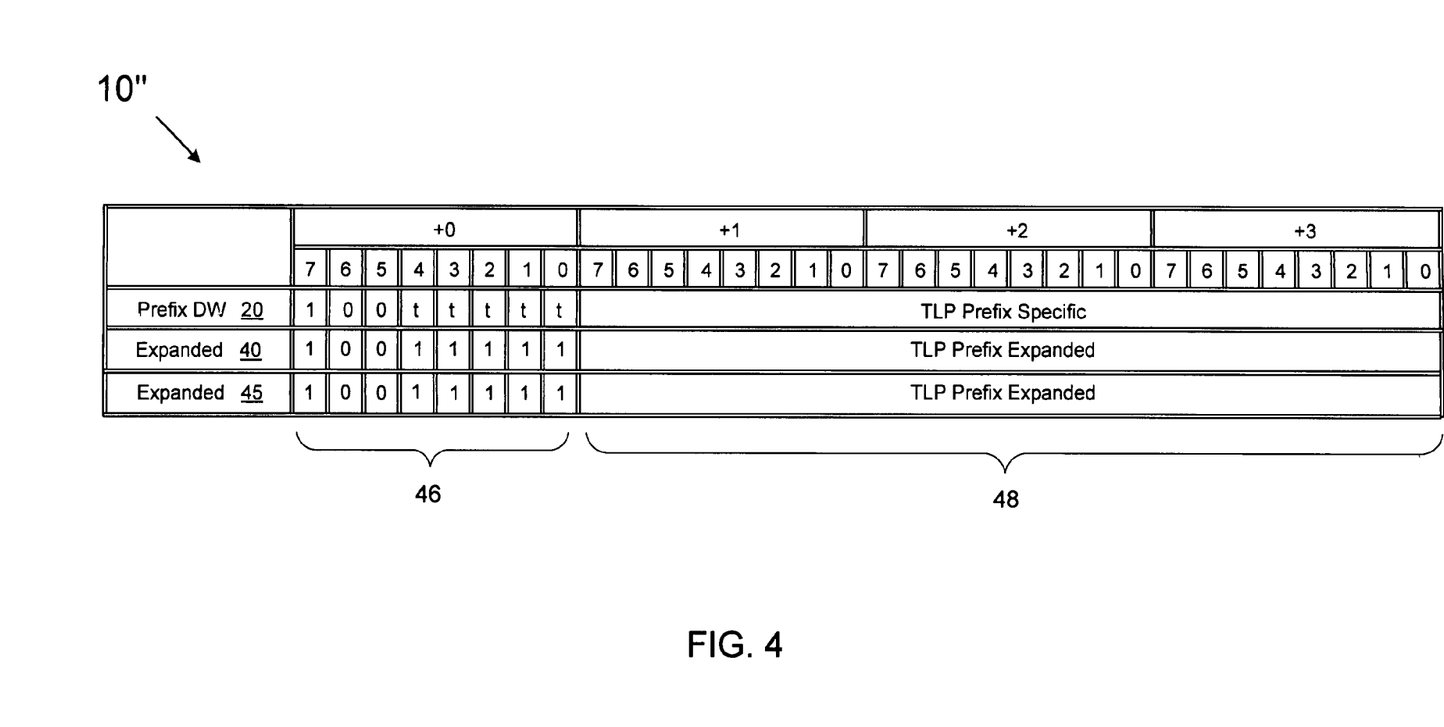
FIG. 4 is a block diagram of a TLP prefix header expanded in accordance with one embodiment of the present invention.

Referring now to FIG. 4, shown is a block diagram of a TLP prefix header expanded in accordance with one embodiment of the present invention. As shown in FIG. 4, is a block diagram of data 10" includes an expanded TLP prefix header in accordance with an embodiment of the present invention. That is, in addition to a first prefix DW 20, two additional expanded prefix DWs 40 and 45 are present. In this way, additional information can be provided. Note that both expanded prefixes 40 and 45 have the same opcode assignment, namely "10011111," which as seen above in Table 1 corresponds to the TLP prefix expansion code. Thus the prefix specific field 48 associated with these two expanded prefixes can provide additional information, e.g., additional data to that present in prefix double word 20.

In certain cases, TLP prefix stacking may be used, in which multiple TLP prefixes are allowed to be appended to other TLP prefixes or TLP headers (and which may be considered a stack). The following rules apply for stacking TLP prefixes, in one embodiment. TLP prefixes can be stacked on top of each other, where the stacked TLP prefixes can be base TLP prefixes or expansion TLP prefixes. Multiple TLP prefixes are allowed to be stacked. Global TLP prefixes can be stacked on top of other global TLP prefix or a standard header TLP, but not on top of a link local TLP prefix. In contrast however, link local TLP prefixes can be stacked on top of any other TLP prefix or header TLP.

Figure 5A:
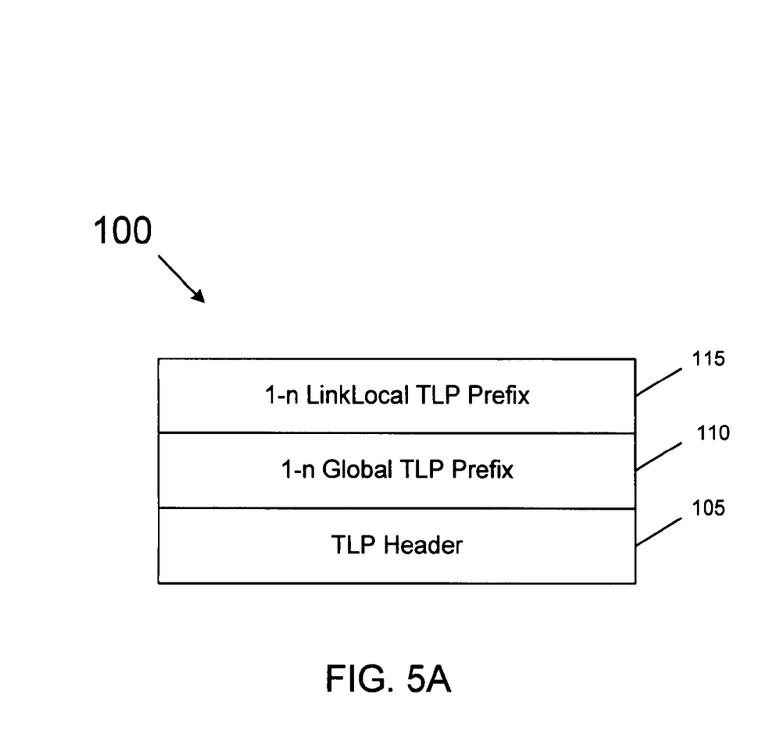
FIGS. 5A-5B are stacking of TLP prefixes and header in accordance with one embodiment of the present invention.
Figure 5B:
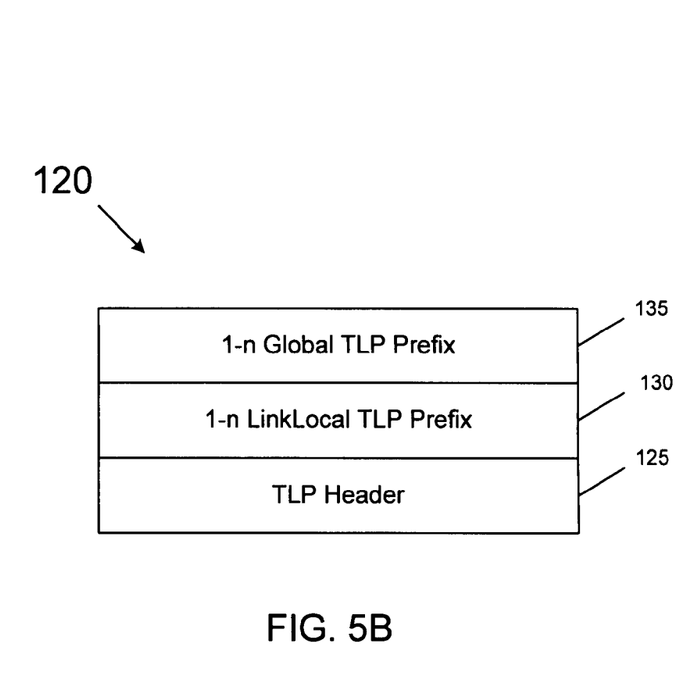

FIG. 5A shows a permitted stacking of TLP prefixes and a header in accordance with one embodiment of the present invention. As shown in FIG. 5A, a stack 100 including a TLP header 105, 1-N global TLP prefixes 110 and 1-N link local TLP prefixes 115 is provided. In one embodiment, such a stack 100 may be permitted, as link local TLP prefixes 115 are stacked on top of global prefixes 110 (which in turn are stacked on TLP header 105). In contrast, as shown in FIG. 5B stack 120 may not be permitted in certain embodiments, as global TLP prefixes 135 may not be allowed to be stacked upon link local TLP prefixes 130.

As described above, TLP prefixes can be expanded and stacked. Thus a receiver may detect the base TLP to determine the type of TLP for routing and flow control purposes. The rules for detecting the base TLP according to one embodiment are as follows: once a TLP prefix is detected (i.e., by presence of the predetermined prefix code of 100 in the three MSB's of the first byte of the prefix), all subsequent DWs are scanned until a non—100 encoding for these bits is detected. The number of DWs counted in the interim are TLP prefixes, either stacked or extended. Note that there is not need for a separate terminate bit to detect end of TLP prefixes.

According to the PCIe protocol, a header flow control granularity is one unit of header credit, where a unit equals 16 bytes (B) (considering 16 B corresponding to a TLP header). A TLP prefix DW (i.e., a base TLP prefix or extended TLP prefix) appended to a header TLP consumes one additional header credit (in addition to the base header credit).

An architected configurable maximum TLP prefix size parameter may be set for various components. Specifically, a receiver has to hold the TLP prefixes in a storage element until the standard TLP is detected, after which it can move the TLP into the appropriate buffer resource (for which the flow control was accounted for). Thus the capability of a receiver's intermediate/staging buffers should be considered, i.e., a limit of number of TLP prefix DW's that can be issued in a packet. This granularity can be defined as a maximum TLP prefix size supported, e.g., in multiples of header granularity—1, 2, 4, etc. This architected configuration parameter may be referred to as a maximum TLP prefix size, and can be discovered by providing a field in a PCIe capabilities register and programmed via a PCIe control register.

Figure 6A:
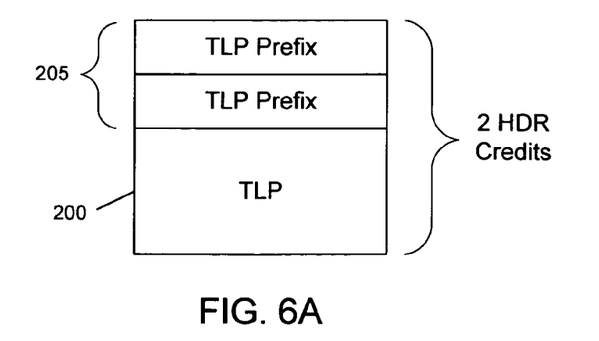
FIGS. 6A-6C are different header credit allocations in accordance with an embodiment of the present invention.
Figure 6B:
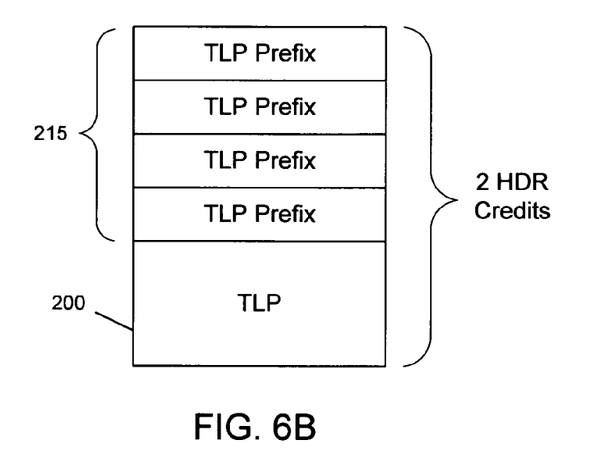
Figure 6C:
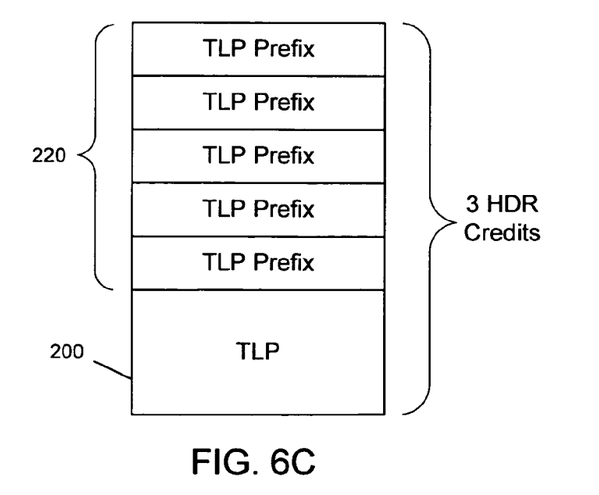

Thus as shown in FIG. 6A, when two TLP prefixes 210 are stacked on a TLP 200, two header credits are needed, as in addition to the single header credit needed for a 16 B header, an additional credit is needed to support the two TLP prefixes. Similarly, as shown in FIG. 6B, the same two header credits can be used to support a stack of TLP prefixes 215 that has four DWs (i.e., 16 bytes). In contrast, as shown in FIG. 6C, three header credits are needed to support a prefix stack 220 that includes five double words, as 20 bytes worth of credit are needed to support this stack 220. While shown with this particular implementation in FIGS. 6A-6C, different header credit rules may apply in other embodiments.

Figure 7:
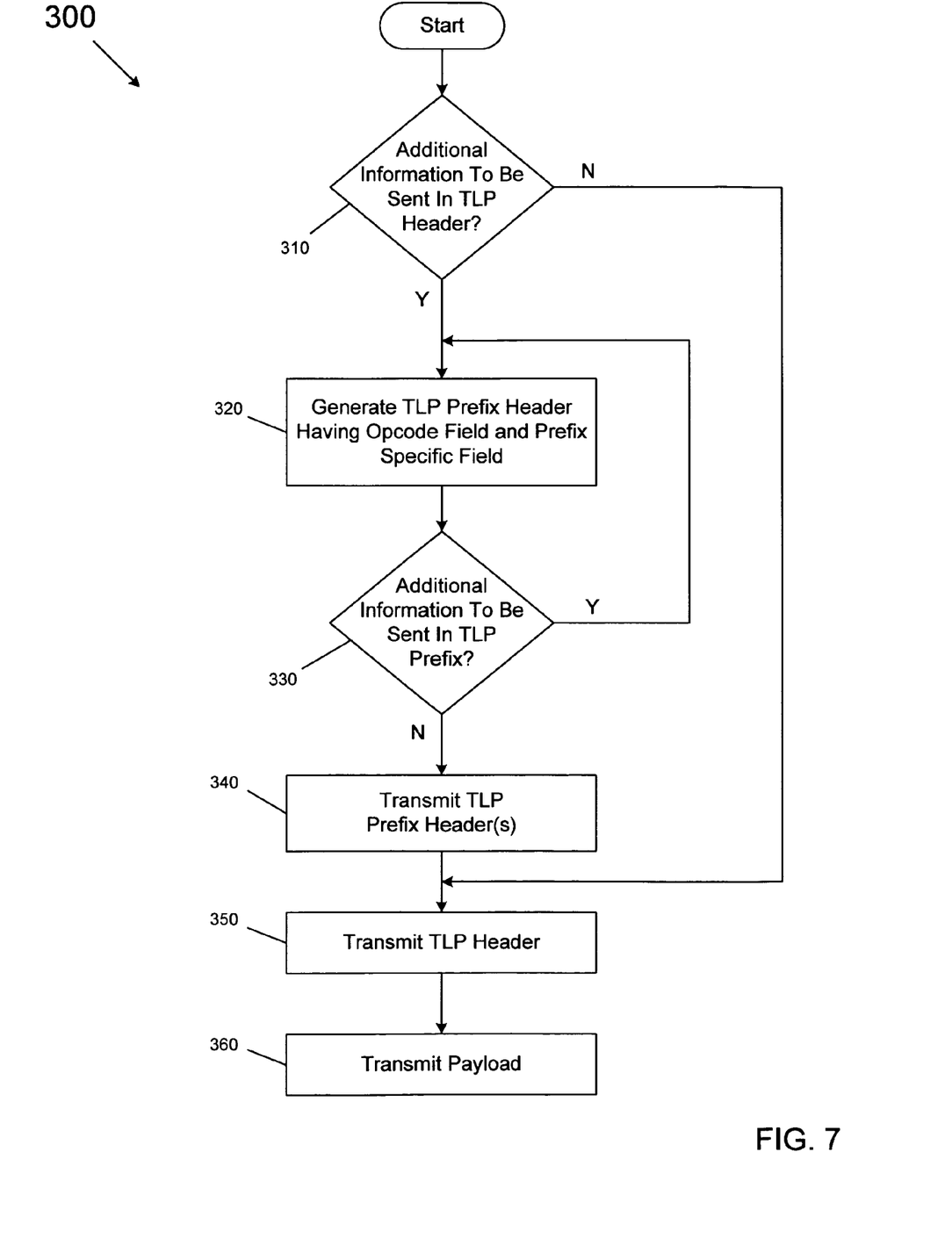
FIG. 7 is a flow diagram of a method in accordance with one embodiment of the present invention.

Referring now to FIG. 7, shown is a flow diagram of a method in accordance with one embodiment of the present invention. As shown in FIG. 7, method 300 may be implemented by a transaction layer of a transmitting device to generate a TLP prefix in accordance with an embodiment of the present invention. Method 300 may begin by determining whether additional information is to be sent in a TLP header (diamond 310). While not limited in this regard, such additional information may be used to encapsulate further data to the TLP header, provide additional routing information for intermediate routing elements, provide transaction processing, and so forth. If such additional information is to be provided, control passes to block 320.

At block 320 a TLP prefix header may be generated having an opcode field and a prefix specific field. In one embodiment, the TLP prefix header may be generated such as the base header shown in FIG. 2. Next it may be determined whether in addition to the information provided in this base prefix header, additional information is to be included in the TLP prefix (diamond 330). If so, control loops back to block 320. Otherwise, the one or more prefix header units may be transmitted (block 340). That is, such TLP prefix units may be sent from the transaction layer to a data link layer, and onto a physical layer and then across a link to a receiving device, which may correspondingly pass this information through a physical layer, a data link layer and to a transaction layer of the receiving device for decoding and handling.

After transmission of the TLP prefix header, a TLP header, which may be a conventional TLP header including various fields such as a format field, type field and so forth may be transmitted (block 350). Such transmission may occur in the same manner as for the TLP prefix header. After such TLP header transmission, any payload that is also to be transmitted with the TLP is sent (block 360). Receipt and handling of the prefix, TLP header and additional packet information may occur in the receiver using the various layers. While shown with this particular implementation in the embodiment of FIG. 7, the scope of the present invention is not limited in this regard.

Thus embodiments may provide flexibility in the information provided in a packet header, without the need for ad-hoc solutions or using reserved header fields to provide/introduce new features or point solutions. In some embodiments, a TLP prefix enables ease of definition and implementation, such that there is minimal ecosystem impact and a scalable solution. TLP prefixes can be stacked/expanded, as described above, which can be used to provision for future support such as encodings defined for various vendors, or encodings defined for expansion. Still further, no new flow control types are needed.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    generating a prefix header having an opcode field and a prefix specific field for a first packet to be transmitted from a transmitter, including generating the opcode field including a first portion with a predetermined value to indicate presence of the prefix header and a second portion to indicate an opcode; and
    transmitting the first packet from the transmitter to a receiver along an interconnect, the first packet including the prefix header followed by a header.

2. The method of claim 1, further comprising generating the prefix header with an expanded prefix header including a plurality of units each including an opcode field and a prefix specific field.

3. The method of claim 1, further comprising including routing information in the prefix header for an intermediate receiver of the first packet.

4. The method of claim 3, further comprising generating the prefix header as a local prefix to be processed by the intermediate receiver.

5. The method of claim 1, further comprising generating the prefix header as a global prefix to be passed through the receiver without decoding by the receiver.

6. The method of claim 1, further comprising generating the prefix header including a plurality of stacked prefix units, wherein at least some of the stacked prefix units are global prefix units that are to be passed through a routing element without decoding.

7. The method of claim 6, wherein at least some of the stacked prefix units are local prefix units that are to be processed in the routing element to provide additional routing information to the routing element.

8. An apparatus comprising:
    a first component to communicate with a second component over a point-to-point (PtP) interconnect, wherein the first component is to transmit a first packet along the PtP interconnect, the first packet including a header prefix having an opcode field and a data field, wherein the opcode field has a first portion with a predetermined value to indicate presence of the header prefix and a second portion to indicate an opcode, the first packet further including a header following the header prefix.

9. The apparatus of claim 8, wherein the first component is to transmit the first packet with an expanded header prefix including a plurality of units each including the same opcode field and a different data field.

10. The apparatus of claim 8, wherein the first component includes a link layer to generate a first header prefix and a transaction layer to generate a second header prefix, wherein the first and second header prefixes are associated with the header.

11. The apparatus of claim 10, wherein the first header prefix is to provide routing information for an intermediate routing element coupled to the PtP interconnect.

12. The apparatus of claim 8, wherein the first component is to generate the header prefix including a plurality of stacked prefix units, wherein at least some of the stacked prefix units are global prefix units that are to be passed through a routing element without decoding.

13. The apparatus of claim 8, wherein the first component is to generate the prefix header including a plurality of prefix units, wherein a first prefix unit includes the opcode field having a first opcode value corresponding to an encoding to be decoded by a receiver and the remaining prefix units include the opcode field having a second opcode value to indicate that the corresponding data field is associated with the first prefix unit.

14. A system comprising:
    a transmitter to transmit a first transaction layer packet (TLP) including a header prefix having an encoding field and a data field, wherein the encoding field has a first portion with a predetermined value to indicate presence of the header prefix and a second portion to indicate an opcode, a first code to indicate presence of an expanded prefix in the first TLP, or a second code to indicate presence of opcode information in the data field, the first TLP further including a header following the header prefix;
    a receiver coupled to the transmitter by a point-to-point (PtP) interconnect; and
    a dynamic random access memory (DRAM) coupled to the receiver and transmitter.

15. The system of claim 14, wherein the transmitter is to transmit the first packet with the expanded prefix including a plurality of units each having the first code and a different data field.

16. The system of claim 14, wherein the transmitter is to generate the header prefix including a plurality of stacked prefix units, wherein at least some of the stacked prefix units are global prefix units that are to be passed through a routing element without decoding.

17. The system of claim 16, wherein the plurality of stacked prefix units is to consume a single header credit if the number of prefix units is less than a predetermined threshold.

18. The system of claim 14, wherein the transmitter is to generate the prefix header including a plurality of prefix units, wherein a first prefix unit includes the encoding field with the second portion having a first opcode value corresponding to an opcode to be decoded by the receiver and the remaining prefix units include the encoding field with the second portion having the first code to indicate that the corresponding data field is associated with the opcode of the first prefix unit.

19. The system of claim 14, wherein the receiver includes a configuration register having a maximum prefix parameter corresponding to a maximum expanded prefix that can be handled by the receiver.

* * * * *